Sept. 15, 1964          A. VALFELLS          3,149,248
METHOD OF AND MEANS FOR GENERATING ELECTRICAL ENERGY
Filed April 3, 1961          2 Sheets-Sheet 1
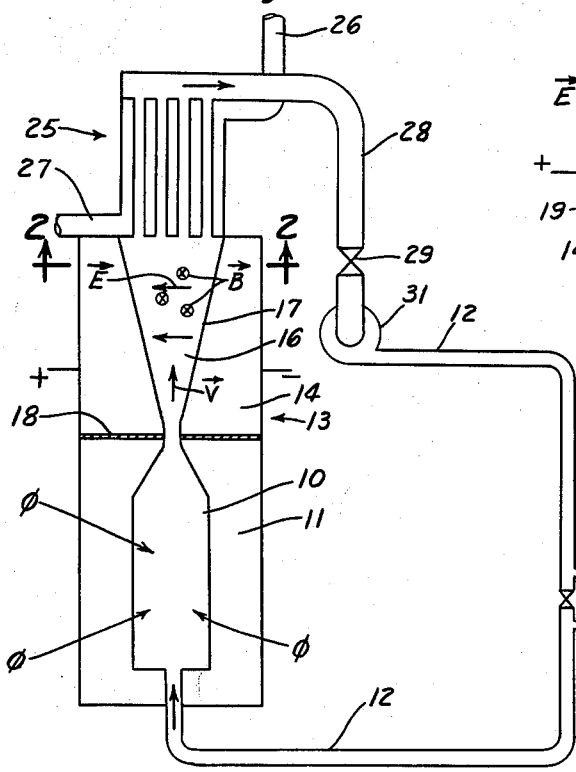
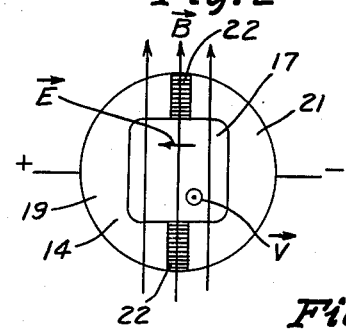
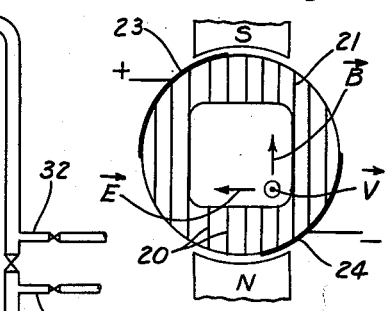
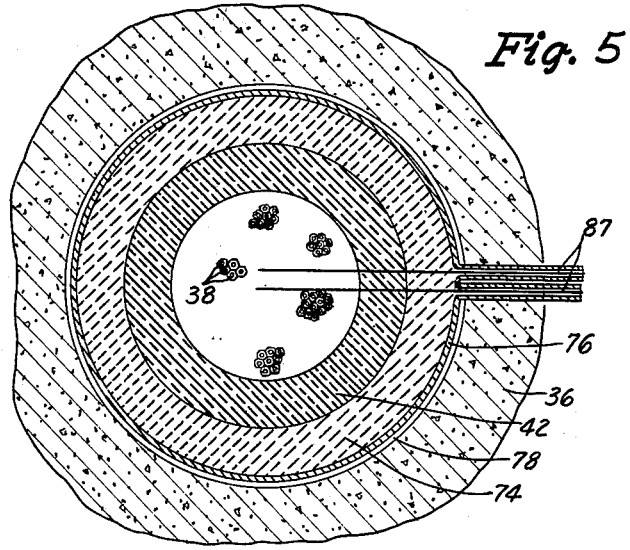
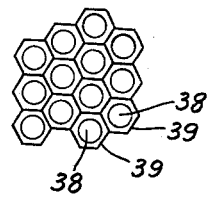
INVENTOR
AGUST. VALFELLS
BY
*Lowell & Henderson*
ATTORNEYS Sept. 15, 1964     A. VALFELLS     3,149,248
METHOD OF AND MEANS FOR GENERATING ELECTRICAL ENERGY
Filed April 3, 1961     2 Sheets-Sheet 2

INVENTOR
AGUST VALFELLS
BY
Lowell & Henderson
ATTORNEYS

United States Patent Office 3,149,248
Patented Sept. 15, 1964

1

3,149,248
METHOD OF AND MEANS FOR GENERATING
ELECTRICAL ENERGY
Agust Valfells, Box 111, Reykjavik, Iceland
Filed Apr. 3, 1961, Ser. No. 100,037
13 Claims. (Cl. 310—11)

This invention relates generally to the production of electrical energy, and more particularly to a novel method of and means for converting nuclear energy into electrical energy.

It is known that any conductor of electricity that is moved through a magnetic field will generate in itself a current of electricity. This applies to gases which become conductors when they are heated to a degree such that some of their atoms ionize. Therefore, if forced through a magnetic field, a stream of ionized gas causes an electrical current to flow across it.

It is also known that the conductivity of the gas will be determined mostly by the electron mobility and that operation at the highest temperatures enhances thermal ionization of the gas and maximizes the thermodynamic efficiency of the device. It is proposed here to achieve such high temperatures by the use of fission, wherein the fissile isotope is carried in the working fluid itself.

The invention therefore proposes a system for converting nuclear energy into electrical energy by causing fission to take place in a gaseous mixture carrying a fissionable isotope. The fission occurs in a chamber to such an extent as to cause the gas to heat to a temperature such that appreciable thermal ionization of the gas occurs. As a result of the heating, subsequent expansion of the gas gives it a sufficiently high velocity prior to its being forced into one or more magnetohydrodynamic generators, where by the use of a magnetic field, a current is induced in the ionized gas and which current is drawn off by electrodes placed in the gas stream or incorporated in the generator. The gas is then cooled in a heat exchanger, recompressed, and recycled to the fission chamber with the exception of a small fraction of the gas which is bled off for removal of fission products and replenishment of the fissile isotope before being also returned to the system.

For the functioning of the system, a neutron flux is necessary within the fission chamber, and as described in detail hereinafter four arrangements are possible for providing the flux. A first arrangement is by placing the fission chamber in an ordinary reactor and introducing an external neutron flux. A second arrangement is by enlarging the fission chamber depending on the materials used to such an extent that the dimensions become critical, thus enabling the chain reaction to supply all its own neutron flux a fast-fission type reactor. A third arrangement is by making the fission chamber a homogeneous thermal gaseous reactor by the additional introduction of a gaseous moderator into a fission chamber of critical dimensions; and a fourth arrangement is by arranging in a lattice formation an array of fission chambers of sufficient number in a moderating medium thus providing a heterogeneous thermal reactor of a critical size.

It is therefore an object of this invention to provide a new method of and means for converting nuclear energy into electrical energy.

Still another object of this invention is to utilize a working fluid including a fissile matter transported in a gaseous phase having a low ionization potential, and wherein the fissile matter provides the thermal energy source for ionization taking place in the gaseous phase, and for expansion of the working fluid at a velocity through a magnetohydrodynamic generator for the production of electrical energy.

2

Another object of this invention is the provision of a method of and means for producing electric energy by means of a magnetohydrodynamic generator that uses, as a working fluid, a gas containing either in suspension or as a part of the gas, a compound of an element that has a fissionable isotope and which is enriched with respect to that isotope, in conjunction with a substance having a low ionization potential.

Yet another object of this invention is the provision of a method of and means for producing electric energy by means of a magnetohydrodynamic generator that uses, as a working fluid, a gaseous compound of an element that has a fissionable isotope and which is enriched with respect to that isotope, in conjunction with a substance having a low ionization potential.

These objects, and other features and advantages of the present invention will become readily apparent upon reference to the following description when taken in conjunction with the accompanying drawings, wherein:

FIG. 1 is a schematic diagram of an embodiment of the invention, certain parts being deleted as unnecessary to the illustration;

FIG. 2 is a cross sectional view taken along the line 2—2 in FIG. 1;

FIG. 3 is a cross sectional view similar to FIG. 2 and showing a modified nozzle construction of the embodiment of FIG. 1;

FIG. 5 is an enlarged fragmentary cross sectional view taken along the line 5—5 in FIG. 4; and FIG. 6 is a greatly enlarged view of a group of the array of fission chambers as seen in cross section in FIG. 5.

Figure 4:
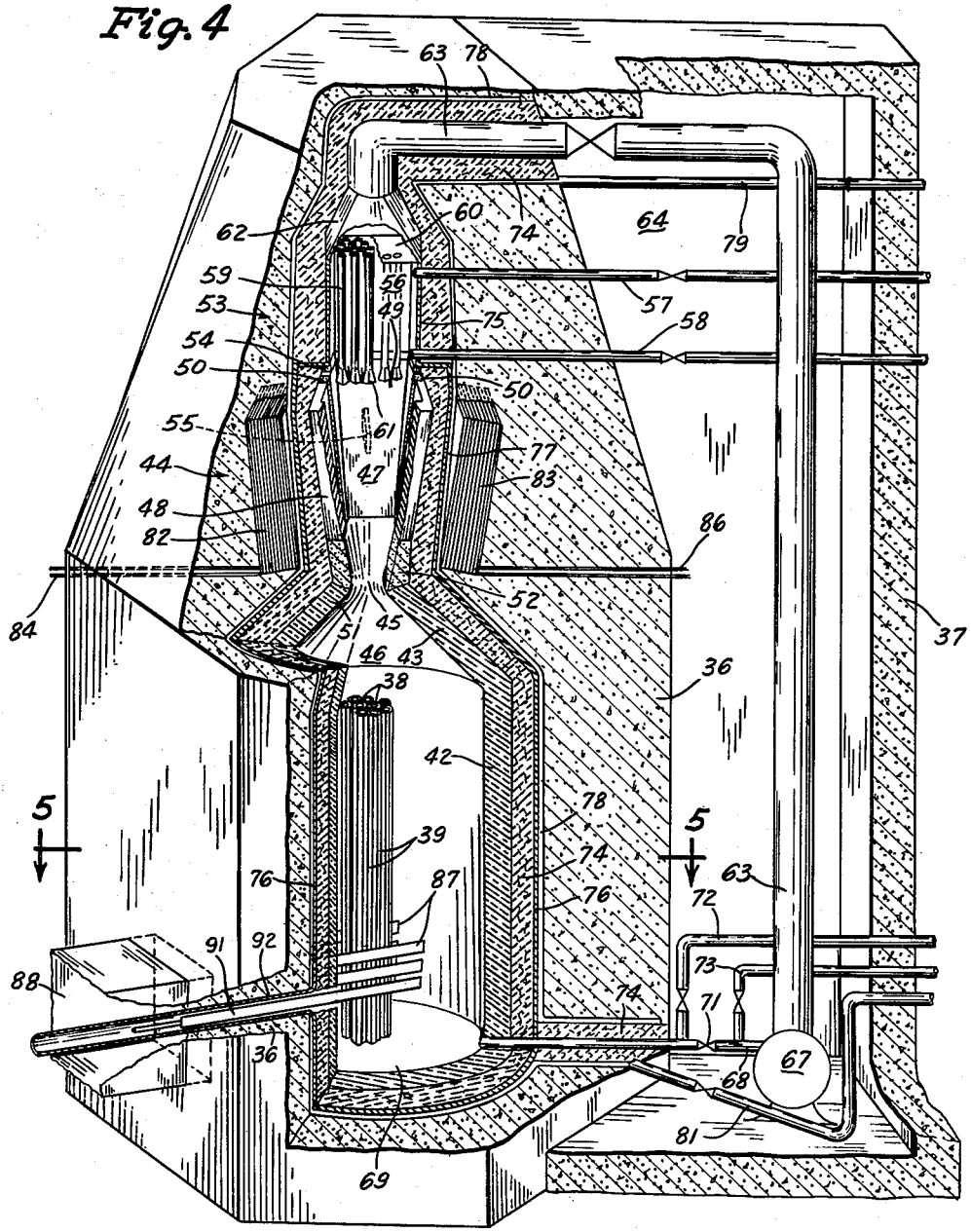
FIG. 4 is an enlarged perspective cutaway view of a modified embodiment of the invention, with certain parts broken away, and shown in cross section for clarity of illustration.

Referring now to the drawings and particularly to FIG. 1, a fission chamber 10 is formed within a housing 11 of graphite or the like capable of withstanding high temperatures. Graphite may be exposed to temperatures of the order of 3000° K. A gas carrying a fissile isotope is introduced into the fission chamber 10 by means of a pipe 12. The fissile isotope may be carried in the gas, either in the form of a gaseous compound of the isotope, or as a suspension of a nongaseous compound of the isotope suspended in the main body of the gas. Within the fission chamber 10 and in the presence of a neutron flux $\phi$, fission will take place and the gas will heat to such a temperature as to cause appreciable ionization to occur within it.

The gas should meet at least two criteria in that it should be chemically very stable at high temperatures and the macroscopic neutron capture (i.e. nonfission) cross section of the gas should be small. A gas that fulfills both these criteria for example is uranium-235 tetrafluoride ($U^{235}F_4$). As this gas has a high ionization potential, in order to promote ion formation it is advisable to lace it with another gas that has a lower ionization potential. This may be done for example by providing a small amount of uranium tri-iodide ($UI_3$) in the gaseous phase. At the operating temperature, it will decompose to form free uranium and iodine gases the former of which will provide most of the ions in the mixture because of its relatively low ionization potential.

Therefore, by the introduction of uranium-235 tetrafluoride gas laced with uranium tri-iodide into the fission chamber 10, this gaseous mixture as the working fluid will be heated by fission taking place within itself and will cause thermal ionization to occur in the gaseous phase.

The size of the fission chamber 10 is a function of the thermal power level, the operating pressure and temperature, the available or permissible magnitude of the neutron flux, the mole fraction of uranium-235 tetrafluoride in the gas, and the materials used in the system, as well as the mode of supplying the neutron flux. It may be computed by the application of reactor theory.

From the fission chamber 10, the gas expands and passes through a nozzle unit 13 comprising a core 14 within which is formed a converging-diverging nozzle 16 (FIG. 1), commonly called a DeLaval nozzle, in order that it acquire sufficient velocity to cause induced current to flow when the resulting jet of gas traverses a magnetic field about the divergent part 17 of the nozzle 16. In the embodiment of FIGS. 1 and 2, the core 14, which encases the divergent part 17 of the nozzle 16 is formed of material, such as graphite, capable of withstanding high temperatures. If need be, the divergent nozzle part 17 is electrically insulated from the housing 11 by an insulating material 18 similarly capable of withstanding high temperatures, such as a ceramic insulator.

To design the nozzle 13 is is assumed that the uranium fissioned and converted in the system each second must be removed from the fission chamber at the same rate. If $\overline{M}$ is the average molecular weight of the gas and $f$ the fraction of the $U^{235}$ that is fissioned and converted, then $\overline{M}/yf$ moles of the mixture must be removed for each kg. atom of $U^{235}$ fissioned and converted to $U^{236}$. The gas mixture removal rate, $w$, in kg./sec., will then be:

$$w = \frac{3.1 \times 10^{10}(1+\alpha)Q\overline{M}}{N_{Av}yf}$$

where, $Q$=thermal power level, watts
$N_{Av}$=Avogadro's number, $6.03 \times 10^{26}$ molecules/kg. mole
$\alpha$=ratio of capture to fission cross section for the $U^{235}$ nucleus
$\overline{M}$=average molecular weight of the mixture kg./kg. mole Once the weight rate of gas removal has been determined, nozzle theory permits the exact design of the nozzle 16 which will depend on the desired expansion of the gas. The amount of expansion depends on the desired efficiency which may be affected by the cost of electrical power relative to construction costs of the apparatus.

To obtain electrical energy from the expanding gas, a magnetic field is formed about the divergent nozzle part 17 as indicated by the symbols ⊗, designated $\vec{B}$ in FIG. 1. When the gas enters the magnetic field in the divergent nozzle part 17 with a velocity $\vec{V}$ and in the direction indicated by the arrow (FIG. 1), a potential $\vec{E}$ will be induced in a direction as indicated by its arrow pertaining thereto.

Where the divergent part 17 of the nozzle is constructed of ordinary graphite, it must be separated longitudinally into two halves 19 and 21 (FIG. 2) by an insulating material 22. The induced current can then be made to flow through an external load (not shown) by attaching the load to the segmental halves 19 and 21 whereby they function as electrodes.

Another arrangement for inducing a potential $\vec{E}$ is shown in FIG. 3 wherein instead of ordinary graphite 14 a core of pyrographite 21 is utilized. Pyrographite is extremely anisotropic in many of its properties, for example, its electrical conductivity in a direction normal to its molecular stratification is only about one-thousandth as great as its conductivity in the parallel direction. By constructing the modified nozzle core 21 (FIG. 3) entirely of pyrographite with the direction of its molecular layers 20 oriented parallel to the magnetic field vector $\vec{B}$, as well as the gas velocity vector $\vec{V}$, the electric potential induced in the gas jet would result in a potential gradient to be established across the nozzle in essentially the non-conducting direction. The core 21 would then not effectively short the established potential which could still be made to drive a current through an external circuit. This could be accomplished by connecting an external load through connections 23 and 24 (FIG. 3) to the nozzle core 21 in such a manner that the current flow to the load would be in a direction parallel to the molecular layers 20 within the pyrographite core 21.

As the partially cooled and expanded gas leaves divergent part 17 of the nozzle 16 (FIG. 1), it enters and passes through a heat exchanger 25 having cooling air inlet and outlet pipes 26 and 27. The size of the heat exchanger 25 can be determined from heat exchanger theory taking into account the quantity of heat to be removed and the heat transfer coefficients corresponding to the conditions prevailing in the gas and coolant fluid. The quantity of heat to be removed will depend on the amount of expansion in the nozzle 16 as well as limitations thereon due to the properties of the particular working fluid (phase changes, etc.). From the heat exchanger 25, the cooled gas is transmitted through a conduit 28 and a valve 29 to a compressor 31 where it is recompressed before being introduced back into the conduit 12 for re-entry into the fission chamber 10. A small fraction of the gas is continually bled off at a pipe 32 to be processed for fission product removal and replenishment of the fissile isotope, then subsequently returned to the conduit 12 through pipe 33.

Hereinbefore, it was stated that it was necessary that a neutron flux be present in the fission chamber 10 and several different arrangements were suggested. One was the provision of making the fission chamber 10 of such dimensions as to cause it to go "fast critical," i.e., critical on fast neutrons. Another arrangement is where the fission chamber 10 is smaller than the critical size needed for self-sustaining fast fission. This would probably be the case with any practical structure, as at such low gas densities as correspond to the operating conditions the fast critical size would be impractically large. Here, the neutron flux could be obtained by placing the fission chamber 10 in the center of a conventional annular reactor.

A third arrangement would be to mix a moderating gas, such as deuterium, with the uranium tetrafluoride gas and along with a gas having a low ionization potential to introduce the mixture into a single fission chamber of critical dimensions, thus forming the basis for a thermal homogeneous gaseous reactor.

A fourth arrangement is illustrated as a complete system in FIGS. 4–6 inclusive and is basically a heterogeneous thermal reactor. A concrete radiation shield 36 (FIG. 4) having a diameter of approximately thirty feet about the base, for a hundred thermal megawatt reactor, is provided for encasing all of the system except a few external conduits, etc., and these are also enclosed by a concrete wall 37.

Within the shield 36, an array of fission chambers 38 (FIGS. 5 and 6) is arranged in a lattice formation in a moderating medium 39 capable of withstanding high temperatures, such as graphite or pyrographite. The number of fission chambers 38 is sufficient to provide a heterogeneous thermal reactor of a critical size. For example, as shown in FIG. 6, each fission chamber 38 is formed within a column of moderating material 39 having a hexagonal cross section, whereby the lattice also has a hexagonal structure. Other lattice arrangements, such as a square lattice for example, would also be satisfactory. The entire array is surrounded by a reflector wall 42 of graphite which extends the entire height of the fission chambers 38 and then converges as a part 43 of a nozzle unit 44 to a nozzle throat 45.

The nozzle unit 44 includes a converging passage 46 in communication with the upper ends of the fission chambers 38, and a diverging passage 47 in communication with the passage 46 by the throat 45. The passage 47 is formed by a pair of electrodes 48 and 49 of electrically conductive material, such as graphite or pyrographite, and which form together a square cross section (FIG. 4). The electrodes 48 and 49 are laterally separated by insulator strips 50 which extend the entire height of the electrodes. Each electrode includes a bus bar 55 (only one showing) for conducting electricity away from the respective electrode. The electrodes and the insulator strips are insulated from the graphite part 43 by an insulator block 52 having a circular base. In keeping with the square cross section of the diverging passage 47, the interior of the insulator block 52 converges from a circular opening to a square one, and its sides mate at the upper ends with the bases of the electrodes 48 and 49.

At the upper end of the electrodes 48 and 49, a heat exchanger unit 53 is provided and which is separated from the electrodes by a square insulator ring 54 mounted on top of the electrodes 48 and 49 and the insulator strips 50. The heat exchanger unit 53 includes a chamber 56 in communication with coolant fluid inlet and outlet conduits 57 and 58, respectively. A plurality of parallel, elongated pipes 59 are arranged within the chamber 56 and through which the gas passes as it is being cooled by the coolant fluid circulating through the chamber 56 and about the pipes 59. The lower ends 61 of the pipes 59 are flared to a square opening design, and by arranging the ends 61 in a side-to-side relation forming a grid formation, no flat surfaces are formed across the bottom of the heat exchanger unit 53 to impede the flow of the gas. At the top of the unit 53, the pipes 59 join with a horizontally disposed plate 60 which prevents, in conjunction with the joined lower ends 61 of the pipes 59, the coolant fluid from mixing with the working gas.

From the pipes 59, the gas flows through a converging hood 62 into a large circular outlet conduit 63 which passes outside the shield 36 into the area 64 enclosed by the wall 37. A compressor 67 is provided in communication with the conduit 63 for recompressing the gas. It is then directed through an inlet conduit 68 which extends through the shield 36 and the reflector wall 42 to a header area 69 below the fission chamber 38. On either side of a valve 71 in the inlet conduit 68, valved pipes 73 and 72 leading outside the wall 37 are provided, respectively, for taking off a fraction of the working gas for removal of fission products, and for replenishment of the fissile isotope prior to sending the working gas in a reprocessed state back to the system.

Within the reactor, a circular wall 74 of refractory is built completely about the reflector wall 42, following its contour upwardly from the reactor base and also enclosing the nozzle unit 44, the heat exchanger unit 53, the hood 62 and the conduit 63 within the concrete shield 36. The fuel inlet conduit 68 is also covered with refractory 74. A metal sheath or cladding 76, of steel for example, surrounds the refractory wall 74, except for the inlet conduit 68 area, and extends upwardly to the area of nozzle throat 45 where it merges with a gas-tight cladding 77 of a nonmagnetic material. This cladding 77 extends upwardly to a level with the upper insulator ring 54 where it is joined with a cladding 75 which extends transversely into the refractory 74 and lays on top of the upper insulator ring 54. The cladding 75 is capable of withstanding high temperatures and is arranged so as to form and enclose the heat exchanger chamber 56 until it meets and mates with the metal hood 62 which may be constructed of the same material. By this arrangement a gas-tight envelope encloses the whole part of the system containing gas within the reactor.

For cooling purposes, a continuous gap 78 is formed between the cladding 76 and 77 and the concrete shield 36, and also between the refractory wall 74 and the shield 36 in the area of the heat exchanger unit 53, the hood 62, and the conduits 63 and 68. An inlet conduit 79, at the upper end of the gap 78, and an outlet conduit 81, at the lower end of the gap 78, are provided for recirculating cooling fluid therethrough.

To complete the nozzle unit 44, a pair of magnets 82 and 83 having electrical connections 84 and 86, respectively are mounted on opposed sides of the unit 44 so as to set up a magnetic field with the lines of flux substantially perpendicular to (1) the flow direction of the gas through the diverging passage 47, and (2) to normal vectors of the electrodes. The field strength of the magnets is preferably at least 10,000 gauss. The system is completed by the insertion of a plurality of control rods 87 (FIGS. 4 and 5) into the lattice formation of fission chambers 38. The rods 87 are constructed of a neutron absorbing material capable of withstanding the temperatures encountered in the fission chambers 38. An example of such material would be a dispersion of hafnium carbide (HfC) in graphite. The outer end 91 (FIG. 1) of each control rod 87 is housed for reciprocal movement in a pressurized cylinder 92 of non-magnetic material, closed at its outer end (not shown), and which itself is housed in a control box 88 imbedded in the shield 36. Within the control box 88, the size of which depends upon the specific control means employed, such means, magnetic or otherwise, are provided for effecting longitudinal axial movement of the rod 87 within the cylinder 92.

In operation of the heterogeneous thermal reactor system of FIG. 4, assume that the control rods 87 are properly positioned, the magnetic field is applied substantially transversely of the nozzle unit diverging passage 47, and cooling fluid is being circulated through the air gap 78 and the heat exchanger chamber 56. A working fluid comprising a gaseous compound such as enriched uranium tetrafluoride laced with a gaseous substance such as uranium tri-iodide is circulated from, for example, the compressor 67 through the inlet conduit 68 to the header area 69.

The fluid then passes through the plurality of fission chambers 38 where fission occurs and the fluid heats to a temperature sufficient to partly ionize itself. It then expands, due to the heat, at a high velocity through the nozzle throat 45 and passes in the form of a jet through the passage 47 where in the presence of the magnetic field, current is induced within the fluid. The current flows across the passage 47 between the electrodes 48 and 49 and is conducted to a load (not shown) by the bus bars 55. The gas then enters and passes through the pipes 59 in the heat exchanger chamber 56 where part of the heat due to the fission is removed, and then flows through the conduit 63 to the compressor 67, the cycle then being repeated. The system is substantially a closed one except for the necessity of continually bleeding off a fraction of the fluid to remove the fission products therefrom and replenishing the used fissile isotope, the processed fluid being returned to the system.

In summation, the invention comprises a method of and apparatus for producing electric energy from a working fluid carrying a fissionable isotope by utilizing fission taking place within the working fluid itself.

I claim:

1. The method of generating electrical energy comprising: providing a fissionable isotope carried by a gas, providing a substance also carried by the gas having a low ionization potential, heating the gas by means of fission of the isotope whereby the gas is thermally ionized and caused to expand so as to have a velocity, providing a magnetic field, directing the gas in a jet stream through the magnetic field in such a maner that an electric potential is established across the gas stream, utilizing the said electric potential, removing the heat from the gas, removing the fission products, replenishing the isotope, and recycling the gas through said aforementioned steps.

2. The method of generating electrical energy comprising: providing a fissionable isotope carried by a gas, providing a substance also carried by the gas having a low ionization potential, transmitting the gas into a fission chamber, providing a neutron flux in the chamber, heating the gas by means of fission of the isotope within the fission chamber whereby the gas is thermally ionized and expanded, providing a magnetic field, directing the expanding gas in a jet stream through the magnetic field in such a manner that an electric potential is established across the gas stream, utilizing the electric potential, removing the heat from the gas, removing the fission products, replenishing the isotope, and recycling the gas through said aforementioned steps.

3. The method of generating electrical energy comprising: providing a fissionable isotope carried by a gas, said isotope being in sufficient quantity to sustain a chain reaction, providing a substance also carried by the gas and having a low ionization potential, providing a fission chamber of a critical size, transmitting the gas into said fission chamber, heating the gas by means of fission of the isotope within the fission chamber whereby the gas is ionized and expanded, providing a magnetic field, directing the expanding gas in a jet stream through the magnetic field in such a manner that an electric potential is established across the gas stream, utilizing the electric potential, removing the heat from the gas, removing the fission products, replenishing the isotope, and recycling the gas through said aforementioned steps.

4. The method of generating electrical energy comprising: providing a fissionable isotope carried by a gas, said isotope being in sufficient quantity to sustain a thermal chain reaction, providing a substance also carried by the gas and having a low ionization potential, mixing the gas with a gaseous moderator whereby to form a gaseous mixture, introducing the gaseous mixture into a fission chamber of a critical size, heating the gaseous mixture by means of fission of the isotope within the fission chamber whereby the gaseous mixture is ionized and expanded, providing a magnetic field, directing the expanding gaseous mixture in a jet stream through the magnetic field in such a manner that an electric potential is established across the jet stream, utilizing the electric potential, removing the heat from the gas, removing the fission products, replenishing the isotope, and recycling the gaseous mixture through the aforementioned steps.

5. The method of generating electrical energy comprising: providing a fissionable isotope carried by a gas, said isotope being in sufficient quantity to sustain a thermal chain reaction, providing a substance also carried by the gas and having a low ionization potential, arranging an array of fission chambers of sufficient number in a moderator thus providing a heterogeneous thermal reactor of a critical size, passing the gas through the array of fission chambers and causing a self-sustaining fission reaction of the isotope whereby the gas is thermally ionized and expanded, providing a magnetic field, directing the expanding gas in a jet stream through the magnetic field in such a manner that an electric potential is established across the gas stream, utilizing the electric potential, removing the heat from the gas, removing the fission products, replenishing the isotope, and recycling the gas through the aforementioned steps.

6. A system for generating electrical energy comprising: housing means having formed therein a chamber, a fissionable isotope carried by a gas, a substance having a low ionization potential also carried by said gas, means for transmitting said gas into said chamber, means for providing a neutron flux in said chamber, whereby upon the introduction of said gas into said chamber, fission of the isotope occurs resulting in the gas heating to a temperature sufficiently high to cause the gas to thermally ionize and to expand, means forming a magnetic field, means forming a nozzle in communication with said chamber through which said gas expands in a stream at a velocity and for directing said gas through said magnetic field whereby an electric potential is established across the gas stream, means for utilizing the electric potential, means for removing heat from said gas subsequent to said utilization, means for removing fission products from said gas and for replenishing said isotope, and means for recycling said processed gas through said system.

7. A system for generating electrical energy comprising: housing means having formed therein a chamber, a fissionable isotope carried by a gas, a substance having a low ionization potential also carried by said gas, means for transmitting said gas into said chamber, means external said chamber for providing a neutron flux therein whereby upon the introduction of said gas into said chamber fission of the isotope occurs resulting in the gas heating, ionizing, and expanding, means forming a converging-diverging nozzle having its convergent end in communication with said chamber, whereby said gas expands with a velocity through said nozzle, means forming a magnetic field across said nozzle whereby an electric potential is established across said expanding gas within said nozzle, means for utilizing said electric potential, means for removing heat from the gas subsequent to the potential utilization, means for removing the products of fission from the gas and for replenishing said isotope therein, and means for recycling the processed gas through the system.

8. A system for generating electrical energy comprising: housing means having formed therein a chamber of critical size, a fissionable isotope carried by a gas, said isotope being of a sufficient quantity to sustain a chain reaction, a substance having a low ionization potential also carried by said gas, means for transmitting said gas into said chamber where a self-sustaining fission reaction occurs causing said gas to heat resulting in ionization and expansion of said gas, means forming a converging-diverging nozzle the convergent end of which is in communication with said chamber, means forming a magnetic field across a portion of said nozzle whereby an electric potential is established across said nozzle portion upon the expansion of said ionized gas therethrough, means for utilizing said electric potential, means for cooling said gas subsequent to said utilization, means for removing fission products from said gas and for replenishing said isotope, and means for recycling said processed gas through said system.

9. A system for generating electrical energy comprising: housing means having a fission chamber formed therein of a critical size, a fissionable isotope carried by a gas, a substance having a low ionization potential also carried by said gas, mixing the gas with a gaseous moderator to form a gaseous mixture, means for transmitting said gaseous mixture into said chamber where a self-sustaining fission reaction occurs causing said gaseous mixture to heat resulting in ionization and expansion of said gaseous mixture, means forming a converging-diverging nozzle the convergent end of which is in communication with said fission chamber, means forming a magnetic field across a portion of said nozzle whereby an electric potential is established across said nozzle portion upon the expansion of said ionized gaseous mixture therethrough, means for utilizing said electric potential, means for cooling said gaseous mixture subsequent to said utilization, means for removing fission products from said gaseous mixture and for replenishing said isotope, and means for recycling said processed gaseous mixture through said system.

10. A system for generating electrical energy comprising: housing means having a chamber formed therein, a moderator in said chamber in which is formed an array of fission chambers in a lattice formation and of sufficient number to form a thermal heterogeneous reactor, a fissionable isotope carried in a gas and of a sufficient quantity to sustain a thermal chain reaction, a substance having a low ionization potential also carried by said gas, means for transmitting said gas through said fission chambers whereby fission of the isotope occurs resulting in the gas heating to cause the gas to thermally ionize and to expand, means forming a magnetic field, means forming a converging-diverging nozzle the convergent end of which is in communication with said chamber and through which said gas expands in a stream at a velocity, said nozzle means capable of directing said gas through said magnetic field whereby an electric potential is established across the gas stream, means for utilizing the electrical potential, means for removing the heat from said gas subsequent to the potential utilization, means for removing fission products from said gas and for replenishing said isotope, and means for recycling said processed gas through said system.

11. An apparatus for generating electrical energy comprising: a plurality of parallel fission chambers in a lattice formation and of a sufficient number to form a thermal heterogeneous reactor, means forming a header area in communication with common ends of said chambers, a fissionable isotope carried in a gas and of a sufficient quantity to sustain a thermal chain reaction, a substance having a low ionization potential also carried by said gas, means forming a conduit leading from external said reactor to said header area for introducing said gas therein whereby said gas flows through said fission chambers, means forming a converging-diverging nozzle through which said gas flows in a stream, the convergent end of said nozzle in communication with the other common ends of said chambers, the divergent portion of said nozzle means including two segmental halves of electrically conductive material functioning as electrodes, means electrically insulating said electrodes from each other, means mounted adjacent said nozzle means and forming a magnetic field in said gas stream whereby an electric potential is established across said gas stream passage upon the flow of said gas therethrough, means connected to said electrodes for utilizing said electric potential, means in fluid communication with said nozzle means on the opposite side of said chambers for removing heat from said gas, means in fluid communication with said removal means for processing said gas, and means in fluid communication with said conduit for recycling said processed gas through said apparatus.

12. An apparatus for generating electrical energy comprising: a plurality of parallel fission chambers in a lattice formation and of a sufficient number to form a thermal heterogeneous reactor, means forming a header area in communication with common ends of said chambers, a fissionable isotope carried in a gas and of a sufficient quantity to sustain a thermal chain reaction, a substance having a low ionization potential also carried by said gas, means forming a conduit leading from external said reactor to said header area for introducing said gas therein whereby said gas flows through said fission chambers, means forming a converging-diverging nozzle through which said gas flows in a stream, the convergent end of said nozzle in communication with the other ends of said chambers, said nozzle forming means being of a material anistropic with respect to its electrical conductivity, having the greatest conductivity in a direction parallel to its molecular layers, with its molecular layers oriented parallel to the longitudinal axis of said nozzle so that the material is substantially nonconductive in a direction normal to said layers, means mounted adjacent said nozzle means for establishing a magnetic field in said gas stream therein, means connecting an external load to said nozzle material whereby an induced current in said gas stream flows to the load and in a direction in said material parallel to said layers, means connected to said nozzle means for removing heat from said gas subsequent to its flow through said nozzle means, means for processing said gas, and means for recycling said processed gas through said apparatus.

13. An apparatus for generating electrical energy comprising: a plurality of parallel fission chambers in a lattice formation and of a sufficient number to form a thermal heterogeneous reactor, means forming a header area in communication with common ends of said chambers, a fissionable isotope carried in a gas and of a sufficient quantity to sustain a thermal chain reaction, a substance having a low ionization potential also carried by said gas, means forming a conduit leading from external said reactor to said header area for introducing said gas therein whereby said gas flows through said fission chambers, means forming a converging-diverging nozzle through which said gas flows in a stream, the convergent end of said nozzle in communication with the other ends of said chambers, said nozzle means being of an electrically nonconductive material, means for establishing a magnetic field in said nozzle means through which said gas stream flows, electrode means mounted in said nozzle means and adapted to be contacted by said gas, means connected to said electrodes for utilizing a current generated in said gas stream and conducted by said electrode means, means connected to said nozzle means for removing heat from said gas subsequent to its flow through said nozzle means, means for processing said gas, and means for recycling said processed gas through said apparatus.

References Cited in the file of this patent

FOREIGN PATENTS 837,658     Great Britain _____ June 15, 1960

OTHER REFERENCES

Nucleonics, pages 50–55, August 1957.
Astronautics, pages 23–25, October 1959.
Electronics, page 82, Nov. 27, 1959.
Westinghouse Engineer, July 1960, pages 105–107.